United States Patent
Backfolk et al.

(10) Patent No.: US 12,152,115 B2
(45) Date of Patent: Nov. 26, 2024

(54) PATTERNED LIQUID REPELLENT NANOCELLULOSIC FILM

(71) Applicant: Stora Enso OYJ, Helsinki (FI)

(72) Inventors: Kaj Backfolk, Lappeenranta (FI); Isto Heiskanen, Imatra (FI); Nina Miikki, Imatra (FI)

(73) Assignee: Stora Enso OYJ, Helsinki (FI)

( * ) Notice: Subject to any disclaimer, the term of this patent is extended or adjusted under 35 U.S.C. 154(b) by 0 days.

(21) Appl. No.: 17/756,985

(22) PCT Filed: Dec. 22, 2020

(86) PCT No.: PCT/IB2020/062325
§ 371 (c)(1),
(2) Date: Jun. 7, 2022

(87) PCT Pub. No.: WO2021/130669
PCT Pub. Date: Jul. 1, 2021

(65) Prior Publication Data
US 2023/0018981 A1    Jan. 19, 2023

(30) Foreign Application Priority Data
Dec. 23, 2019 (SE) .................................. 1951551-9

(51) Int. Cl.
*C08J 5/18* (2006.01)
*B32B 3/30* (2006.01)
(Continued)

(52) U.S. Cl.
CPC ...... *C08J 5/18* (2013.01); *B32B 3/30* (2013.01); *B32B 5/02* (2013.01); *B32B 23/08* (2013.01);
(Continued)

(58) Field of Classification Search
CPC .......... C08J 5/18; C08J 7/048; C08J 2301/02; B32B 3/30; B32B 5/02; B32B 23/08;
(Continued)

(56) References Cited

U.S. PATENT DOCUMENTS

| | | | |
|---|---|---|---|
| 10,118,322 B2 * | 11/2018 | Mizuta | ................. G03F 7/0002 |
| 2004/0191480 A1 | 9/2004 | Karasawa et al. | |

(Continued)

FOREIGN PATENT DOCUMENTS

| | | | | |
|---|---|---|---|---|
| CN | 1282392 A | * | 1/2001 | ............ D21F 11/006 |
| CN | 110204753 A | | 9/2019 | |

(Continued)

OTHER PUBLICATIONS

Telecka, Agnieszka et al., Superhdrophobic Properties of Nanotextured Polypropylene Foils Fabricated by Roll-to-Roll Extrusion Coating, ACS Macro Letters, 5(9), 1034-1038. https://doi.org/10.1021/acsmacrolett.6b00550.

(Continued)

*Primary Examiner* — Jacob T Minskey
*Assistant Examiner* — Stephen M Russell
(74) *Attorney, Agent, or Firm* — Greer, Burns & Crain, Ltd.

(57) ABSTRACT

A textured film is provided which comprises nanocellulose. At least a first surface of the film comprises a patterned, textured surface formed by repeating protruding regions and at least one non-protruding region arranged between said protruding regions. A particular height difference between the protruding and non-protruding regions can give liquid repellent properties. Methods for making the textured film are also provided.

7 Claims, 3 Drawing Sheets

(51) Int. Cl.
- B32B 5/02 (2006.01)
- B32B 23/08 (2006.01)
- B32B 37/14 (2006.01)
- B32B 37/20 (2006.01)
- B32B 38/18 (2006.01)
- C08J 7/048 (2020.01)
- D21H 11/18 (2006.01)
- D21H 19/34 (2006.01)

(52) U.S. Cl.
CPC .......... B32B 37/144 (2013.01); B32B 37/203 (2013.01); B32B 38/1866 (2013.01); C08J 7/048 (2020.01); D21H 11/18 (2013.01); D21H 19/34 (2013.01); *B32B 2307/412* (2013.01); *B32B 2307/7248* (2013.01); *B32B 2307/7265* (2013.01); *B32B 2307/73* (2013.01); *B32B 2307/732* (2013.01); *B32B 2317/18* (2013.01); *B32B 2553/00* (2013.01); *C08J 2301/02* (2013.01)

(58) Field of Classification Search
CPC . B32B 37/144; B32B 37/203; B32B 38/1866; B32B 2307/412; B32B 2307/7248; B32B 2307/7265; B32B 2307/73; B32B 2307/732; B32B 2317/18; B32B 2553/00; D21H 11/18; D21H 19/34
See application file for complete search history.

(56) References Cited

U.S. PATENT DOCUMENTS

| | | |
|---|---|---|
| 2006/0137840 A1 | 6/2006 | Burazin et al. |
| 2011/0287227 A1 | 11/2011 | Moser |
| 2012/0177881 A1 | 7/2012 | Lee et al. |
| 2013/0227972 A1 | 9/2013 | Hatton et al. |
| 2013/0251948 A1 | 9/2013 | Lyons et al. |
| 2015/0257943 A1* | 9/2015 | Noel .................. A61F 13/4704 604/385.101 |
| 2016/0325008 A1 | 11/2016 | Laukkanen et al. |
| 2017/0144202 A1 | 5/2017 | King et al. |
| 2017/0266062 A1* | 9/2017 | Raycheck ............. A61F 13/534 |
| 2017/0267827 A1* | 9/2017 | Rowan ..................... C08J 9/283 |
| 2018/0187377 A1* | 7/2018 | Ziegenbein ............. D21F 11/14 |
| 2019/0112494 A1 | 4/2019 | Thalappil et al. |

FOREIGN PATENT DOCUMENTS

| | | |
|---|---|---|
| EP | 2837736 A1 | 2/2015 |
| JP | 2018103473 A | 7/2018 |
| JP | 2018145546 A | 9/2018 |
| WO | 2015101711 A1 | 7/2015 |

OTHER PUBLICATIONS

Liu, Hui et al., Recent Progress in Fabrication and Applications of Superhydrophobic Coating on Cellulose-Based Substrates, Materials, 2016, 9, 124; doi:10.3390/ma 9030124.

Teisala, H. et al., Development of superhydrophobic coating on paperboard surface using the Liquid Flame Spray, ScienceDirect, Surface and Coatings Technology, vol. 205, Issue 2, Oct. 15, 2010, pp. 436-445.

Wang, Zhiwei et al., Fabrication of highly water-repelling paper by surface coating with stearic acid modified calcium carbonate particles and reactive biopolymers, Journal of Bioresources and Bioproducts, 2017, 2(2): 89-92.

International Search Report from corresponding PCT application No. PCT/IB2020/062325, mailed on Feb. 25, 2021.

Mäkelä, Tapio et al., Fabrication of micropillars on nanocellulose films using a roll-to-foll nanoimprinting method, Microelectric Engineering 163 (2016), 1-6.

Hong, Sungmoo et al., A Study on Miro/Nano Pattern Replication Using a Hydroxyethyl Cellulose Polymer, Journal of the Korean Physical Society, vol. 67, No. 11, Dec. 2015, pp. 1966-1969.

Higashi, K. et al., A Simple Method for Micropatterning Nanofibrous Hydrogel Film, 2016 38th Annual International Conference of the IEEE Engineering in Medicine and Biology Society (EMBC), Aug. 16-20, Orlando, FL, USA, pp. 145-148, ISSN 1557-170X.

Extended European Search Report from corresponding European application No. EP20905909.6, dated Nov. 21, 2023.

\* cited by examiner

PATTERNED LIQUID REPELLENT NANOCELLULOSIC FILM

This application is a U.S. National Phase under 35 U.S.C. § 371 of International Application No. PCT/IB2020/062325, filed Dec. 22, 2020, which claims priority under 35 U.S.C. §§ 119 and 365 to Swedish Application No. 1951551-9 filed Dec. 23, 2019.

TECHNICAL FIELD

A textured film is provided which comprises nanocellulose and which has liquid repellent, e.g. hydrophobic properties. Methods for making the textured film are also provided. The film is suitable for packaging e.g. edible liquids or food.

BACKGROUND

Surfaces and structures which are micro- or nanopatterned can provide unique liquid repellent surfaces. Usually, the best effect is obtained by optimizing both surface roughness (texture) and chemistry. Thus, the basic principle is that small cavities or pores are filled with air and that the air thus provides a liquid (water) repellent surface.

The techniques available today for large-scale manufacturing of liquid repellent surfaces are relatively limited. Many of the commercial solutions offer various chemicals which provide particular changes in the surface chemistry, whereas surface patterning is typically less common.

Scientific progress has been made in the case of paper or packaging materials. These include e.g.:
  the use of modified calcium carbonate particles in mineral coating of paper or paperboard (stearic acid modified mineral) see Wang et al., Journal of Bioresources and Bioproducts. 2017, 2(2): 89-92
  the use of atomic layer deposition (ALD) or plasma or liquid flame deposition of chemicals to form highly repellent surfaces, see e.g. Teisala et al. Surface Coatings and Technology, vol. 205, 2, 15 Oct. 2010, pages 436-455
  Use of etching on thermoplastic coatings to create superhydrophobicity e.g. PP foil, see Telacka et al., ACS Macro Letters, 5(9), 1034-1038
  Use of nanoparticle such as silicon-oxide to create nano-roughness texture, etc., see e.g. EP2837736A1

An overview of common techniques to construct superhydrophobic coatings on cellulose-based substrates is given in Liu et al. *Materials* 2013, 9, 124.

A problem with many of the presented techniques and solutions is that they use nanoparticles or chemicals which can migrate into food/liquids, creating problems with toxicity. Another problem is that the liquid repellent surfaces have limited stability, i.e. poor scratch resistance (mechanical or chemical or physical-chemical).

In addition, many of the known solutions are suited to short-term liquid repellence but do not really teach how to make such a surface which can also provide gas and/or WVTR barrier.

Also, most of the techniques are suitable for post-converting and cannot be integrated in an on-line or in-line process. There is also a need to solve the problem of making a patterned or textured surface on a "soft" fiber based material such as nanocellulosic films.

These, and other problems, are addressed by the present invention.

SUMMARY

A textured film is provided, comprising nanocellulose, said textured film extending in a first plane and having opposing first and second surfaces, wherein at least said first surface comprises a repeating pattern of protruding regions and at least one non-protruding region arranged between said protruding regions, wherein each protruding region protrudes a height h from the adjacent non-protruding region(s), said height h being determined in a direction perpendicular to the plane of said textured film, said height h being between 1-100 μm.

Methods for manufacturing the textured film are also disclosed. The use of the textured film as a packaging material is also provided. Other aspects of the technology are described in the following claims and description text.

LEGENDS TO THE FIGURES

DETAILED DISCLOSURE

Figure 1:
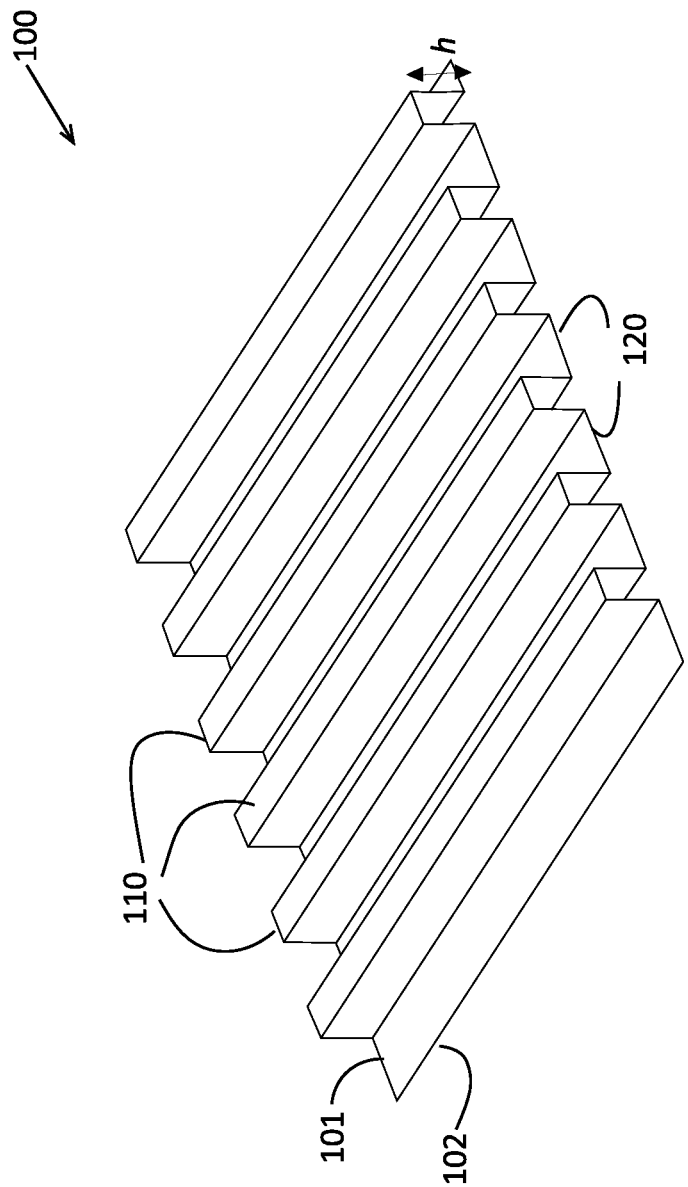
FIG. 1 shows a schematic illustration of one embodiment of the textured nanocellulosic film of the invention.

The present invention provides a patterned or textured surface on a "soft" fiber based material such as nanocellulosic films. Without being bound by theory, the nanocellulosic structure provides structure on a nanometer scale, while the texturing provides structure on a micrometre scale, as required for liquid repellent materials. Nanoscale structure refers to fibril diameter and particles including pores for example having an average size in the region of 1-100 nm. Micrometre scale refers to such particles or structures having an average diameter above 100 nm. The preferred thickness of the film is 5-200 μm. The film has a gravimetric basis weight of 10-100 g/m$^2$ (dry).

"Soft" in this context means for example materials that go back at least partially to their original shape after deforming. In such soft materials, mechanical pressing is difficult due to the characteristic material properties.

A textured film is therefore provided which comprises nanocellulose. Embodiments of the textured film are shown generally in FIGS. 1 and 2. The textured film extends in a first plane and has opposing first 101 and second surfaces 102. At least a first surface 101 of the film comprises a repeating pattern of protruding regions 110 and at least one non-protruding region 120 arranged between said protruding regions 110. A particular height difference between the protruding and non-protruding regions gives liquid repellent properties. In the present text, the term "textured" is used to mean the same as "patterned".

Each protruding region therefore protrudes a height h from the adjacent non-protruding region(s), said height h being determined in a direction perpendicular to the plane of said textured film, said height h being between 1-100 μm. Suitably, the height h is less than 50 μm, more preferably less than 30 μm and most preferably between 0.1 and 20 μm, such as between 1 and 20 μm. In one embodiment the height h is less than 50 μm but larger than 5 μm, or less than 50 μm but larger than 10 μm, or less than 50 μm but larger than 12 μm, or less than 50 μm but larger than 15 μm, or less than 50 μm but larger than 20 μm. In another embodiment the height h is less than 30 μm but larger than 5 μm, or less than 30 µm but larger than 10 µm, or less than 30 µm but larger than 12 µm, or less than 30 µm but larger than 15 µm, or less than 30 µm but larger than 20 µm.

Should the protruding regions/non-protruding regions not have a planar surface, the height h is to be measured as the maximal height of the protruding regions compared to the non-protruding regions.

Typically, the shortest distance a between adjacent protruding regions measured in the first plane of the textured film is between 1-1000 µm, preferably between 2-500 µm, more preferably between 3-50 µm.

In one aspect, each protruding region 110 extends in the first plane of said textured film substantially from one edge of said textured film and substantially to the opposite edge of said textured film. Thus, any water droplet on the first surface 101 can be selectively directed in a desired direction. Such aspects are illustrated in FIG. 1. In such aspects, the contact angle is only high in one direction. This kind of structure is also called channels or microchannels, in which the texture can provide both superhydrophobic and superhydrophilic character. In this embodiment, the width w of the protruding regions is between 0.5-1000 µm, preferably between 0.5-500 µm, more preferably between 0.5-50 µm.

Figure 2:
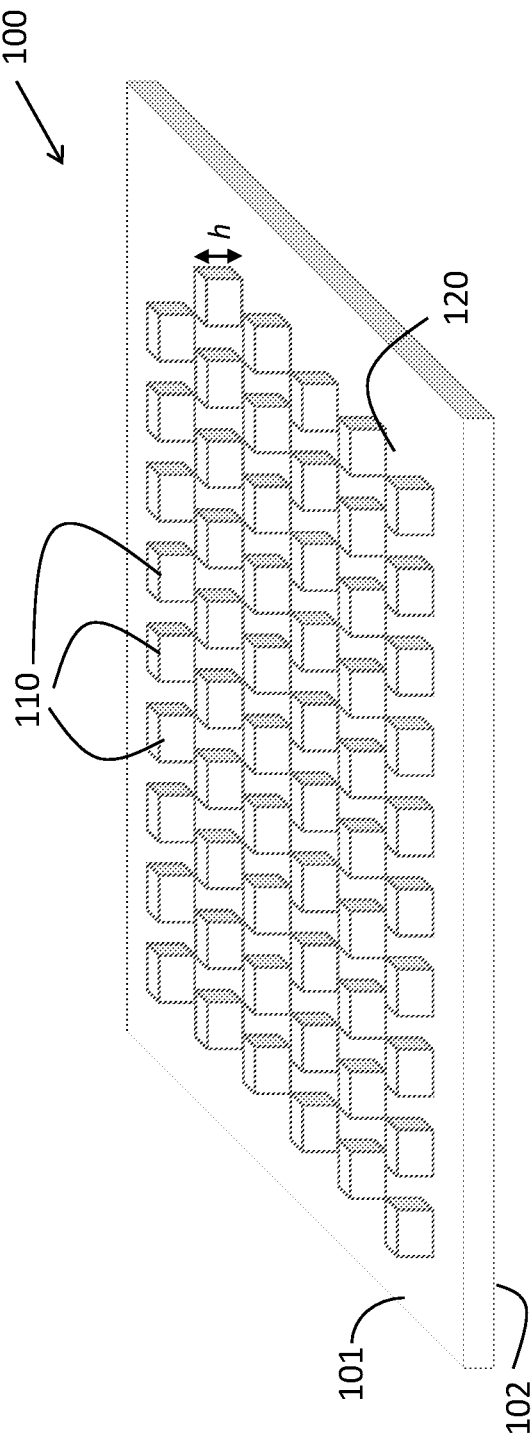
FIG. 2 shows a schematic illustration of another embodiment of the textured nanocellulosic film of the invention.
Figure 3:
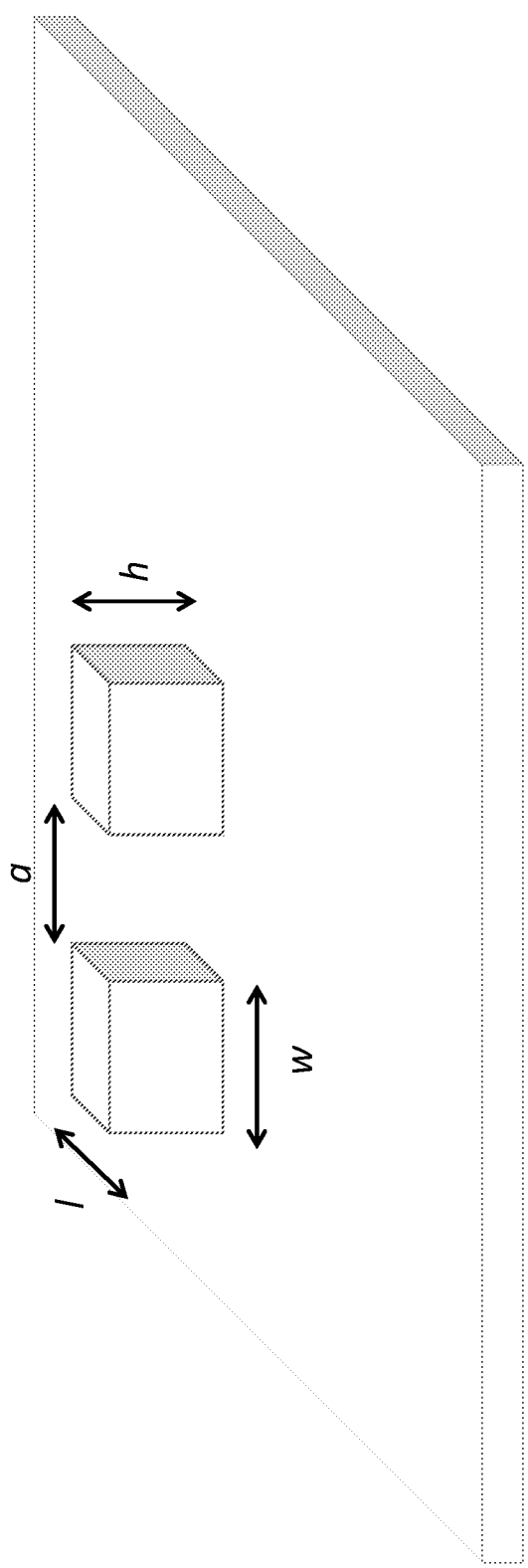
FIG. 3 shows an expanded view of two protruding regions as per FIG. 2.

In another aspect, as illustrated in FIGS. 2-3, each protruding region 110 is essentially cuboid with orthogonal height h, width w and length l dimensions, in which the width w and length l dimensions are measured in the plane of the textured film 100 and the height h dimension is measured perpendicular to both width w and length l dimensions. As also shown in FIG. 3, the shortest distance a between adjacent protruding regions 110 may lie (i.e. is measured in) in a direction perpendicular to said length dimension l.

In this aspect, the width w dimension is between 0.5-1000 µm, preferably between 0.5-500 µm, more preferably between 0.5-50 µm; and/or the length l dimension is between 1-1000 µm, preferably between 2-500 µm, more preferably between 3-50 µm.

In other aspects, each protruding region can have another three-dimensional shape, such as e.g. hemispherical, cylindrical, pyramidal, where all protruding regions have a height h.

In one aspect, one continuous non-protruding region is arranged between and defines said pattern of protruding regions.

A micropattern as described herein can achieve sufficient liquid repellency. For more accurate control of wetting behaviour/hydrophobicity, given values of periodicity, height, and length/width may be preferred.

Furthermore, in certain embodiments the textured first surface of the textured film is coated with a surface treatment composition, such as a hydrophobic surface treatment composition. The surface treatment composition may comprise hydrophobic chemicals such as calcium stearate, fatty acids such as stearic acid, silicones, waxes or hydrocarbons such as AKD, ASA or resins, preferably waxes or resins. Oils and other low polarity chemicals that significantly impact the liquid wetting and absorption behaviour may also be comprised in the surface treatment composition.

One possibility is that the surface treatment composition is applied after patterning. However, care should be taken if the textured surface is coated (surface treatment), to avoid the patterned effect being lost or significantly reduced.

In the present case, the preferred contact angle for water of the first surface is greater than 105 degrees, more preferably more than 110 degrees and most preferably more than 120 degrees. A contact angle between 120-130 degrees may be sufficient. A "superhydrophobic" surface (sometimes called "ultrahydrophobic") is usually defined as a surface having a static contact angle of water greater than 150 degrees. The contact angle is pref. measured for a drop volume of 2-5 microlitre and with a contact time of 0.5 s. at room temperature and 50% RH. Another way to define the surface properties is as the "roll-off" angle, i.e. the angle at which liquid drop rolls off the first surface when tilted. The roll off angle determined at 23 C and 50% RH for water (hydrophobic) or oil (oleophobic) is less than 20 degrees, preferably less than 15 degrees and most preferably less than 10 degrees.

Another possible way to analyse the liquid repellent effect is to measure surface area and determine the roughness factor which should be greater than 1. Roughness factor is determined by actual surface area divided by the projected surface area.

One example of a cuboid patterned surface has the following dimensions; height h of 10 µm, width w of 1 µm, and distance a between protruding regions is 9 µm, then the contact angle for the surface would be at least 108 degrees. Correspondingly, if the cuboid dimensions are height h 10 µm, width w 0.5 µm and distance a 4.5 µm, the contact angle should be at least 101 degrees. Thus, if targeting a certain wetting behaviour, a combination of surface chemistry and microstructure can be used.

One advantage of nanocellulosic films is that they can be transparent to visible light. Preferably, therefore, the textured film has a transparency of more than 50% preferably more than 75% and more preferably more than 85% when measured for a film with grammage of ca 30 gsm using the standard DIN 53147. Note that the nanocellulosic film can have high transparency for visible light but poor transparency for UV light.

The textured film described herein can provide increased barrier at least against one of grease/oil, moisture, oxygen or aroma. The textured film suitably has an Oxygen Transmission Rate (OTR) value less than 5000 $cc/m^2/24$ h (23° C., 50% RH) according to ASTM D-3935 at a grammage between 10-50 gsm, more preferably in the range of 100-1000 $cc/m^2/24$ h. The OTR may also be lower than 100 $cc/m^2/24$ h, such as 5-100 $cc/m^2/24$ h under these conditions. Using a thicker nanocellulose film or a film comprising a high content of a specific water-soluble polymer might give oxygen barrier properties (OTR) even in the range 0.1-10 $cc/m^2/24$ h.

Nanocellulose

The present invention provides a textured film comprising nanocellulose. Nanocellulose shall in the context of the present technology mean a nano-scale cellulose fiber or fibril with at least one dimension, preferably diameter, less than 1000 nm. A nanocellulose suspension might also comprise partly or non-fibrillated cellulose or lignocellulose fibers. The cellulose fiber is preferably fibrillated to such an extent that the final specific surface area of the formed nanocellulose is from about 1 to about 500 $m^2/g$, such as from 10 to 300 $m^2/g$ or more preferably 50-200 $m^2/g$ when determined for a solvent exchanged and freeze-dried material with the BET method. The mean average fibril diameter of the nanocellulose is 1-1000 nm, preferably 10-1000 nm. The nanocellulose may be characterised by analysing high resolution SEM or ESEM images.

There are different synonyms for nanocellulose such as cellulose microfibrils, fibrillated cellulose, nanofibrillated cellulose (NFC), fibril aggregates, nanoscale cellulose fibrils, cellulose nanofibers, cellulose nanofibrils, nanocrystalline cellulose, cellulose microfibers, cellulose fibrils, cellulose nanofilaments, microfibrillar cellulose, microfibrillated cellulose (MFC), microfibril aggregates and cellulose microfibril aggregates.

Suitably, the nanocellulose content in the textured film is at least 50 wt %, preferably at least 60 wt % and more preferably at least 70 wt % based on total solids content of the dry film. In an embodiment, the textured film comprises at most 50 wt %, such as at most 30 wt %, suitably at most 20 wt % of partly or non-fibrillated cellulose or lignocellulose fibers, having a mean average fibril diameter greater than 1000 nm based on total solids content of the dry film.

Various methods exist to make nanocellulose, such as single or multiple pass refining, pre-hydrolysis followed by refining or high shear disintegration or liberation of fibrils. One or several pre-treatment steps are usually required in order to make nanocellulose manufacturing both energy-efficient and sustainable. The cellulose fibers of the pulp to be supplied may thus be pre-treated enzymatically or chemically, for example to reduce the quantity of hemicellulose or lignin. The cellulose fibers may be chemically modified before fibrillation, wherein the cellulose molecules contain functional groups other (or more) than found in the original cellulose. Such groups include, among others, carboxymethyl, aldehyde and/or carboxyl groups (cellulose obtained by N-oxyl mediated oxidation, for example "TEMPO"), or quaternary ammonium (cationic cellulose). After being modified or oxidized in one of the above-described methods, it is easier to disintegrate the fibers into nanocellulose.

The nanocellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, single- or twin-screw extruder, fluidizer such as microfluidizer, macrofluidizer or fluidizer-type homogenizer. Depending on the nanocellulose manufacturing method, the product might also contain fines, or nanocrystalline cellulose or e.g. other chemicals present in wood fibers or in papermaking process. The product might also contain various amounts of micron size fiber particles that have not been efficiently fibrillated.

Nanocellulose can be produced from wood cellulose fibers, both from hardwood or softwood fibers, it can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper, i.e. pre and post-consumer waste.

The nanocellulose can be native (i.e. chemically unmodified), or it can be chemically modified. Phosphorylated nanocellulose is typically obtained by reacting cellulose fibers soaked in a solution of $NH_4H_2PO_4$, water and urea and subsequently fibrillating the fibers. One particular method involves providing a suspension of cellulose pulp fibers in water, and phosphorylating the cellulose pulp fibers in said water suspension with a phosphorylating agent, followed by fibrillation with methods common in the art. Suitable phosphorylating agents include phosphoric acid, phosphorus pentaoxide, phosphorus oxychloride, diammonium hydrogen phosphate and sodium dihydrogen phosphate.

The above described definition of nanocellulose includes, but is not limited to, the definition of nanocellulose in the ISO/TS 20477:2017 standard.

The film may include other cellulosic components. For instance, the film may comprise cationic or anionic nanocellulose; such as carboxymethylated nanocellulose.

Preferably, the textured film is substantially free from non-fibrillated fibers. The amount of pulp fibers and coarse fines can be in the range of 0-60 wt % based on total solids content of the dry film. The amount of pulp fibers and fines may be estimated afterwards e.g. by disintegrating a dry or wet sample, followed by fractionation and analysis of particle sizes of the fractions. Preferably, a never-dried furnish is fractionated and analysed in order to determine the amount of fines and fibers, respectively.

The film may also comprise one or more fillers, such as a nanofiller, in the range of 1-30% by weight based on total solids content of the dry film. Typical nanofillers can be nanoclays, bentonite, silica or silicates, calcium carbonate, talcum, etc. Preferably, at least one part of the filler is a platy filler. Preferably, one dimension of the filler should have an average thickness or length of 1 nm to 10 µm. If determining the particle size distribution of fillers for example with light scattering techniques, the preferred particle size should have an average particle size of less than 800 nm, preferably more than 90% of particles have a diameter below 800 nm.

The film may also comprise polymers such as water-soluble polymers and natural gums. Such polymers can function as strengthening agents. Water soluble polymers can be e.g. polyvinyl alcohol, while natural gums can be e.g. guar gum, cellulose derivatives, hemicelluloses and other polysaccharides, starch (including native starch or modified starch such as, for example, cationic starch, non-ionic starch, anionic starch or amphoteric starch), lignin, proteins or derivatives and/or mixtures thereof.

One preferred group of polymers are cellulose ethers such as sodium carboxymethyl cellulose, methylcellulose, ethylcellulose, hydroxyethylcellulose, hydroxypropylcellulose, and their derivative, preferably with higher degree of substitution. Preferably, the amount of cellulose ethers is in the range of 1-50 wt % and more preferably 5-40 wt % and most preferably 10-30 wt % by weight of the dry film.

In one preferred aspect, the textured film comprises one or more hydrophobic chemicals such as calcium stearate, fatty acids such as steam acid, silicones, waxes, hydrocarbons such as AKD or ASA, or resins, preferably resins or waxes.

In a further aspect, the textured film may also contain retention and drainage chemicals such as cationic polyacrylamide, anionic polyacrylamide, silica, nanoclays, alum, PDADMAC, PEI, PVAm, etc.

In yet a further embodiment, the textured film may also contain other typical process or performance chemicals such as dyes or fluorescent whitening agents, defoamers, wet strength resins, biocides, hydrophobic agents, barrier chemicals, plasticizers, humectants, etc.

A superhydrophobic effect of said first surface can be obtained when the nanocellulose film contains at least 0.5 kg/tn of a hydrophobic chemical such as AKD wax as set out above, based on dry weight of the film. The amount of this treatment composition is at least 0.75 kg/tn, such as at least 0.9 kg/tn, at least 1.0 kg/tn, at least 1.2 kg/tn, at least 1.5 kg/tn, at least 2.0 kg/tn, at least 2.5 kg/tn, at least 3.0 kg/tn, preferably at least 3.5 kg/tn, but less than 20 kg/tn dry content of emulsion/dry content of total film or web. The liquid repellent effect is obtained with the mentioned amounts of hydrophobic chemical in combination with the pattern of the invention.

Methods

Methods for making the textured film are also provided. The present invention uses texturing, which is preferably wet texturing or wet patterning. Texturing differs from embossing, in that embossing is typically a post manufacturing (=converting) step. The invention provides a method to make a microstructure or pattern on a film comprising nanocellulose. It is also believed that texturing solves problems associated with web shrinking.

In a first method for manufacturing a textured film comprising nanocellulose as described herein, the method comprises the steps of:
a. providing a textured belt or cylinder, the surface of said textured belt or cylinder comprising a repeating pattern of recessed regions and at least one non-recessed region arranged between said recessed regions, wherein each recessed region is recessed a depth d from the adjacent non-recessed region(s), said depth d being determined in a direction perpendicular to the surface of said textured belt, said depth d being between 1-100 μm;
b. cast forming an aqueous suspension comprising nanocellulose onto the surface of said textured belt comprising the repeating pattern; and dewatering said suspension to form a wet textured web comprising nanocellulose; and
c. drying said wet textured web, to provide the textured film described herein.

In a second method for manufacturing a textured film comprising nanocellulose according to the invention, the method comprises the steps of:
a. casting or wet-laying an aqueous suspension comprising nanocellulose onto a substantially smooth dewatering surface, and dewatering said suspension to form a wet web comprising nanocellulose;
b. pressing said wet web comprising nanocellulose against a surface of a textured belt or cylinder, said surface of said textured belt or cylinder comprising a repeating pattern of recessed regions and at least one non-recessed region arranged between said recessed regions, wherein each recessed region is recessed a depth d from the adjacent non-recessed region(s), said depth d being determined in a direction perpendicular to the surface of said textured belt or cylinder, said depth d being between 1-100 μm; to provide a wet textured web comprising nanocellulose; wherein, during the pressing step, the wet web comprising nanocellulose is pressed against a permeable surface such as a nonwoven fabric, wire or membrane, and dewatered; and;
c. drying said wet textured web comprising nanocellulose to form the textured film as described herein.

Thus, in one aspect, the first method and the second method, respectively, is a method for manufacturing a textured film comprising nanocellulose, said textured film extending in a first plane and having opposing first 101 and second surfaces 102, wherein at least said first surface 101 comprises a repeating pattern of protruding regions 110 and at least one non-protruding region 120 arranged between said protruding regions 110, wherein each protruding region 110 protrudes a height h from the adjacent non-protruding region(s) 120, said height h being determined in a direction perpendicular to the plane of said textured film, said height h being between 1-100 μm.

In one embodiment, the depth d of each recessed region of the textured belt or cylinder provided in the first method and the second method, respectively, may be of such depth so as to provide a height h less than 50 μm, more preferably less than 30 μm and most preferably between 0.1 and 20 μm, such as between 1 and 20 μm, of each protruding region 110 of the manufactured textured film. In one embodiment the depth d may be of such depth so as to provide a height h less than 50 μm but larger than 5 μm, or less than 50 μm but larger than 10 μm, or less than 50 μm but larger than 12 μm, or less than 50 μm but larger than 15 μm, or less than 50 μm but larger than 20 μm. In another embodiment the depth d may be of such depth so as to provide a height h less than 30 μm but larger than 5 μm, or less than 30 μm but larger than 10 μm, or less than 30 μm but larger than 12 μm, or less than 30 μm but larger than 15 μm, or less than 30 μm but larger than 20 μm.

The shortest distance between adjacent recessed regions of the textured belt or cylinder provided in the first method and the second method, respectively, may be of such length so as to provide a shortest distance a between adjacent protruding regions 110 measured in the first plane of the manufactured textured film of between 1-1000 μm, preferably between 2-500 μm, more preferably between 3-50 μm.

In one embodiment, each recessed region of the textured belt or cylinder provided in the first and the second method, respectively, extends such that each protruding region 110 of the manufactured textured film extends in the first plane of the textured film 100 substantially from one edge of the textured film and substantially to the opposite edge of the textured film 100.

In one embodiment, each recessed region of the textured belt or cylinder provided in the first method and the second method, respectively, is essentially cuboid such that each protruding region 110 of the manufactured textured film is essentially cuboid with orthogonal height h, width w and length l dimensions, in which the width w and length l dimensions are measured in the plane of the textured film 100 and the height h dimension is measured perpendicular to both width w and length l dimensions. The shortest distance a between adjacent protruding regions 110 may lay in a direction perpendicular to said length dimension l. The width w dimension may be between 0.5-1000 μm, preferably between 0.5-500 μm, more preferably between 0.5-50 μm; and/or said length l dimension may be between 1-1000 μm, preferably between 2-500 μm, more preferably between 3-50 μm.

In one embodiment, the recessed regions and the at least one non-recessed region of the textured belt or cylinder provided in the first and second methods, respectively, are arranged such that one continuous non-protruding region 120 is arranged between and defines the pattern of protruding regions 110 of the manufactured textured film.

A suspension of nanocellulose is used to cast the film. The suspension used to cast the nanocellulosic film is an aqueous suspension. The suspension may comprise additional components, as described above; e.g. other cellulosic components; fillers such as nanofillers, polymers such as water-soluble polymers and natural gums; and hydrophobic chemicals.

The suspension may also contain other typical process or performance chemicals. In the above methods, the aqueous suspension comprising nanocellulose has a solids content which is at least 1 wt % and preferably at least 3 wt %, and also less than 30%, preferably less than 20%. Suitably, the nanocellulose content in the aqueous suspension is at least 50 wt %, preferably at least 60 wt % and more preferably at least 70 wt % based on total solids content.

The pH of the nanocellulose suspension is not limited but is preferably 4-10 and more preferably 5-9. The casting step suitably takes place at a temperature of 10-90° C. and more preferably 20-70° C.

The forming process of the nanocellulosic film from the suspension may be cast forming. In this case, cast forming means that the nanocellulose suspension is deposited onto a belt (indirectly or directly) by using preferably a non-contact deposition method. The smooth dewatering surface used for the casting or wet-laying step may be e.g. a surface of a belt or drum. The surface is typically metal, but other materials e.g. plastics may be used. A contact deposition technique could be used but care should be taken that the surface (e.g. of the metal belt) is not damaged by strikes or scratches. The textured film has a grammage of between 1-80 gsm, preferably between 10-50 gsm, such as e.g. 10-40 gsm. For certain applications, the grammage can be low, e.g. 0.1-20 gsm or more preferably even 0.1-10 gsm dry weight.

Dewatering is a process that preferably takes place via both mechanical dewatering such as mechanical pressing or filtering and by evaporating. Mechanical dewatering is preferred since it removes water more cost efficiently than in evaporation. Also, a mechanical dewatering ensures that the contact to the textured belt is good and that the surface texture of the belt may be copied to the film or web. Another benefit of mechanical dewatering is that the applied pressure (negative or positive) densifies the web or film, which promotes the final barrier properties. Dewatering can take place at elevated temperature, although most water is removed mechanically. Vacuum or capillary-based dewatering can also be used separately or simultaneously as the mechanical dewatering. The dewatering step can also be boosted by applying acoustic or ultrasound methods. The mechanical dewatering has also its limitation and therefore the remaining water is preferably removed by evaporating. In this case, the substrate is heated by radiation or convection or by applying hot air or steam.

The wet web may have a solids content of 0.1-80% by weight, such as e.g. 0.5-75% by weight or 1.0-50% by weight after dewatering.

The textured belt/cylinder used to provide the pattern in the nanocellulosic film can be made of metal or plastic, or combinations of suitable materials. A textured belt may have a length of 1-300 m and a width of 0.2-10 m. The textured belt/cylinder might also be coated with e.g. a ceramic or plastic coating e.g. to adjust surface energy.

A pattern of recesses can be created in the textured belt/cylinder by etching non-conducting or conducting channels. It is also possible to deposit material to create protruding areas. One example is to use laser technology for engraving the textured belt/cylinder.

In one aspect of the methods described herein, the nanocellulosic film is surface-treated after it has been dried, e.g. while it has a solids content of 40-99.5% by weight, such as e.g. 60-99% by weight, 80-99% by weight or 90-99% by weight.

In another aspect of the methods described herein, the nanocellulosic film is surface-treated before it has been dewatered and dried, e.g. while it has a solids content of 0.1-80% by weight, such as e.g. 0.5-75% by weight or 1.0-50% by weight.

In one aspect of the methods described herein, the nanocellulosic film has been formed by wet-laying and has a solids content of 50-99% by weight after drying. In another aspect of the methods described herein, the nanocellulosic film has been formed by casting and has a solids content of 50-99% by weight after drying.

The pressure during the patterning and simultaneous dewatering is between 0.5-100 MPa, preferably between 1-50 MPa. The pressure profile can be varied and even altered depending on the process conditions.

In the case of wet web patterning, the initial wet web can be made either with cast forming or wet laying techniques, where there should be a second belt or a patterned cylinder surface that creates the pattern on the wet web, preferably simultaneously as further dewatering and optionally drying occurs. During the patterning, therefore, in the pressing phase, the opposite surface of the nanocellulosic film (i.e. the second surface) is pressed against a permeable surface such as a nonwoven fabric, wire or membrane. The PPS roughness of the (non-patterned) surface is preferably 0.5-100 μm and more preferably 0.1-50 μm, and can be measured using the ISO 8791-4 standard.

Surprisingly, the methods allow not only to create texture or pattern, but also to maintain the barrier properties of the textured nanocellulosic film. The above methods are cost efficient and enable large scale manufacturing of such a textured or patterned film. The created pattern can be e.g. used to adjust and control wetting properties but also to create optical effects.

To assist drying, in one aspect, during the pressing step (step b) of the second method, the opposing (second) surface of the wet textured web comprising nanocellulose is pressed against a permeable surface such as a nonwoven fabric, wire or membrane.

A coating could also be used, which is preferably made with low coat weights and low mechanical impact in order not to destroy/interfere with the patterned surface. To provide a coated textured nanocellulosic film, the methods above may additionally comprise the step of coating said textured first surface and/or said second surface with a surface treatment composition, such as a hydrophobic surface treatment composition.

The textured film may comprise a coating layer on said first surface or said second surface, preferably said second surface. The coating layer may be a polymer layer or a fibrous layer; preferably a polymer layer, more preferably a thermoplastic polymer layer.

The present invention also provides the use of a textured film as described herein as a packaging material, optionally as a laminate with at least one other material, wherein the patterned, textured surface of the film is arranged such that it contacts the contents of the package.

A laminate material is also provided which comprises the textured film as described herein and an additional layer of paper, paperboard or polymeric layer laminated to one surface of the textured film, preferably the second surface thereof.

One example of a packaging material is a laminate comprising at least one additional layer such as PP, PE, PET, PLA or any other thermoplastic polymer layer. The thermoplastic polymer layers are joined to said first or second surface of the textured nanocellulose film. If joined to the patterned surface, the obtained laminate is not a repellent laminate but rather an insulating laminate, as the textured surface can provide micro-holes or "pockets" between the thermoplastic layer and the textured nanocellulose film.

The laminate material can comprise several polymer layers made via e.g. extrusion, lamination or dispersion coating.

Also, the non-patterned surface (the second surface) of the textured film can be laminated with paper or paperboard or other film or substrates. In such a laminate, the grammage of the paper can be e.g. 20-200 gsm and the grammage of the paperboard or containerboard can be e.g. 100-600 gsm.

Both first and second surfaces of the textured film can be printed; preferably the non-patterned surface (second surface) is the printing surface.

According to a further aspect illustrated herein, there is provided a textured film comprising nanocellulose obtainable by the methods for manufacturing a textured film described herein.

According to another aspect illustrated herein, there is provided use of a textured film comprising nanocellulose, obtainable by the methods for manufacturing a textured film described herein, as a packaging material, optionally as a laminate with at least one other material, wherein the textured surface of the film is preferably arranged such that it contacts the contents of the package.

According to a still further aspect illustrated herein, there is provided a laminate material comprising the textured film comprising nanocellulose, obtainable by the methods for manufacturing a textured film described herein, and an additional layer of paper, paperboard or polymeric layer laminated to one surface of the textured film, preferably the second surface thereof.

Although the present invention has been described in relation to a number of embodiments, these are not to be considered limiting for the invention. The skilled person may provide other embodiments falling within the claims by combining various aspects and embodiments as required.

The invention claimed is:

1. A method for manufacturing a textured film with a liquid repellant surface, said method comprising the steps of:
   a. providing a textured belt or cylinder, the surface of said textured belt or cylinder comprising a repeating pattern of recessed regions and at least one non-recessed region arranged between said recessed regions, wherein each recessed region is recessed a depth d from an adjacent non-recessed region, said depth d being determined in a direction perpendicular to the surface of said textured belt, said depth d being between 1-100 μm;
   b. cast forming an aqueous suspension comprising nanocellulose onto the surface of said textured belt comprising the repeating pattern; and dewatering said suspension to form a wet textured web comprising nanocellulose, wherein the aqueous suspension comprises at least 50 wt % nanocellulose, based on a total solids content of said aqueous suspension; and
   c. drying said wet textured web, to provide the textured film, the textured film comprising the nanocellulose, wherein a nanocellulose content in the textured film is at least 50 wt % based on total solids content of the textured film, said textured film extending in a first plane and having opposing first and second surfaces, wherein at least said first surface comprises the liquid repellant surface with a repeating pattern of protruding regions and at least one non-protruding region arranged between said protruding regions, wherein each protruding region protrudes a height h from an adjacent non-protruding region, said height h being determined in a direction perpendicular to the plane of said textured film, said height h being between 1-100 μm.

2. A method for manufacturing a textured film with a liquid repellant surface, said method comprising the steps of
   a. casting or wet-laying an aqueous suspension comprising nanocellulose onto a substantially smooth dewatering surface, and dewatering said suspension to form a wet web comprising nanocellulose, wherein the aqueous suspension comprises at least 50 wt % nanocellulose, based on a total solids content of said aqueous suspension;
   b. pressing said wet web comprising nanocellulose against a surface of a textured belt or cylinder, said surface of said textured belt or cylinder comprising a repeating pattern of recessed regions and at least one non-recessed region arranged between said recessed regions, wherein each recessed region is recessed a depth d from an adjacent non-recessed region, said depth d being determined in a direction perpendicular to the surface of said textured belt or cylinder, said depth d being between 1-100 μm, to provide a wet textured web comprising nanocellulose, wherein, during the pressing step, the wet web comprising nanocellulose is pressed against a permeable surface such as a nonwoven fabric, wire or membrane, and dewatered, and;
   c. drying said wet textured web comprising nanocellulose to form the textured film, the textured film comprising the nanocellulose, wherein a nanocellulose content in the textured film is at least 50 wt % based on total solids content of the textured film, said textured film extending in a first plane and having opposing first and second surfaces, wherein at least said first surface comprises the liquid repellant surface with a repeating pattern of protruding regions and at least one non-protruding region arranged between said protruding regions, wherein each protruding region protrudes a height h from an adjacent non-protruding region, said height h being determined in a direction perpendicular to the plane of said textured film, said height h being between 1-100 μm.

3. The method according to claim 2, wherein the pressure during step b. is between 0.5-100 MPa.

4. The method according to claim 2, further comprising the step of:
   coating the textured first surface, or said second surface of the textured film, or both with a surface treatment composition.

5. The method according to claim 1, wherein the textured film comprises a grammage between 1-80 gsm.

6. The method according to claim 1, wherein the textured film comprises a thickness between 5 to 200 μm.

7. The method according to claim 5, wherein the textured film comprises a thickness between 5 to 200 μm.

\* \* \* \* \*